(12) United States Patent
Crytzer et al.

(10) Patent No.: US 11,728,054 B2
(45) Date of Patent: Aug. 15, 2023

(54) AMBIENT TEMPERATURE DECONTAMINATION OF NUCLEAR POWER PLANT COMPONENT SURFACES CONTAINING RADIONUCLIDES IN A METAL OXIDE

(71) Applicant: Westinghouse Electric Company LLC, Cranberry Township, PA (US)

(72) Inventors: Kurtis R. Crytzer, Concord, NC (US); Lauren R. Ikeda, Manchester, CT (US); Nicole D. Vitale, Export, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 596 days.

(21) Appl. No.: 15/637,621

(22) Filed: Jun. 29, 2017

(65) Prior Publication Data

US 2017/0345519 A1 Nov. 30, 2017

Related U.S. Application Data

(62) Division of application No. 14/065,741, filed on Oct. 29, 2013, now Pat. No. 9,793,018.

(51) Int. Cl.
*G21C 17/022* (2006.01)
*G21C 19/28* (2006.01)
(Continued)

(52) U.S. Cl.
CPC ......... *G21C 17/0225* (2013.01); *G21C 19/28* (2013.01); *G21F 9/004* (2013.01); *G21C 19/307* (2013.01); *G21F 9/30* (2013.01)

(58) Field of Classification Search
CPC .. G21C 19/28; G21C 17/0225; G21C 19/307; G21F 9/004; G21F 9/30
(Continued)

(56) References Cited

U.S. PATENT DOCUMENTS 1,954,473 A 4/1934 Dunn
3,699,052 A 10/1972 Ernest, Jr. et al.
(Continued)

FOREIGN PATENT DOCUMENTS

EP 1939891 A2 7/2008
GB 1102422 A * 2/1968 ........... G21C 19/307
(Continued)

OTHER PUBLICATIONS

Sejvar, "Steam generator channel head decontamination by remote grit blast methods" (1982). (Year: 1982).*
(Continued)

*Primary Examiner* — Jack W Keith
*Assistant Examiner* — Daniel Wasil
(74) *Attorney, Agent, or Firm* — K&L Gates LLP

(57) ABSTRACT

A method for at least partially disrupting or removing radioactive deposits formed on a surface of a structure in a nuclear water reactor is disclosed. The method includes identifying the structure, taking the structure out of operational service, isolating the structure, contacting the surface of the structure with an aqueous solution, and adding an effective amount of an elemental metal in solid form to the aqueous solution. The effective amount includes an amount to at least partially disrupt or remove the radioactive deposits formed on the surface of the structure. The method is conducted at ambient temperature. The radioactive deposits include oxide-containing radionuclides deposited on the surface. The surface is a primary side structure in the nuclear water reactor.

20 Claims, 2 Drawing Sheets

(51) Int. Cl.
*G21F 9/00* (2006.01)
*G21C 19/307* (2006.01)
*G21F 9/30* (2006.01)

(58) Field of Classification Search
USPC .................................................. 376/306, 310
See application file for complete search history.

(56) References Cited

U.S. PATENT DOCUMENTS

| | | | |
|---|---|---|---|
| 4,756,874 | A | 7/1988 | Ruiz et al. |
| 4,759,900 | A | 7/1988 | Peterson et al. |
| 5,108,697 | A | 4/1992 | Esposito et al. |
| 5,171,515 | A | 12/1992 | Panson et al. |
| 5,742,654 | A * | 4/1998 | Morris ................ G21C 19/307 376/306 |
| 6,147,274 | A | 11/2000 | Wood et al. |
| 6,314,153 | B1 | 11/2001 | Henzel et al. |
| 6,652,661 | B2 | 11/2003 | Martin |
| 6,955,706 | B2 | 10/2005 | Varrin, Jr. et al. |
| 7,264,770 | B2 | 9/2007 | Andresen et al. |
| 2005/0105670 | A1 | 5/2005 | Kormuth et al. |
| 2007/0071654 | A1 | 3/2007 | Enda et al. |
| 2008/0107228 | A1 | 5/2008 | Hettiarachchi et al. |
| 2009/0118560 | A1 | 5/2009 | Jones, III et al. |
| 2010/0135450 | A1 | 6/2010 | Fruzzetti et al. |
| 2010/0246745 | A1 | 9/2010 | Hettiarachchi et al. |
| 2011/0120497 | A1 | 5/2011 | Remark et al. |
| 2012/0279522 | A1 | 11/2012 | Varrin, Jr. et al. |
| 2013/0281341 | A1 | 10/2013 | Crytzer et al. |

FOREIGN PATENT DOCUMENTS

| | | | |
|---|---|---|---|
| JP | H032697 | A * | 1/1991 |
| JP | 2007024644 | A | 2/2007 |
| WO | 0078403 | A1 | 12/2000 |

OTHER PUBLICATIONS

International Search Report and Written Opinion of the International Searching Authority for PCT/US2014/040980 dated Nov. 24, 2014 (Forms PCT/ISA/220, PCT/ISA/210, PCT/ISA/237.
European Patent Office, Supplementary European Search Report for European Application No. 14858235.6, dated May 24, 2017.

* cited by examiner

AMBIENT TEMPERATURE DECONTAMINATION OF NUCLEAR POWER PLANT COMPONENT SURFACES CONTAINING RADIONUCLIDES IN A METAL OXIDE

CROSS REFERENCE TO RELATED APPLICATION

This application is a divisional application of U.S. Ser. No. 14/065,741, filed on Oct. 29, 2013, entitled AMBIENT TEMPERATURE DECONTAMINATION OF NUCLEAR POWER PLANT COMPONENT SURFACES CONTAINING RADIONUCLIDES IN A METAL OXIDE, and claims priority thereto.

FIELD OF THE INVENTION

This invention generally concerns systems and methods for radioactive decontamination of deposits at ambient temperature on components in a nuclear power plant and is specifically concerned with disrupting, dissolving, removing and reducing at ambient temperature radionuclides formed on the primary side surfaces of components in a pressurized water reactor and the internal components of a boiling water reactor.

BACKGROUND OF THE INVENTION

In nuclear water reactors, such as pressurized water reactors and boiling water reactors, it is typical for oxide scale-containing radionuclides to be adhered to or generated on surfaces of structures, e.g., components and related parts or piping, which are in contact with fluid, e.g., coolant, over extended time periods during reactor operation. Nuclear water reactors are generally thermal reactors in which water is used as the coolant. The water passes through numerous metal components, such as stainless steel and Alloy 600, Alloy 690 or Alloy 800 conduits. Even though these materials of construction are highly resistant to corrosion, thin oxide coatings (or films) develop over time on the surface areas of components and related parts or piping which are wetted by the coolant during power operation of the reactors. It has been found that portions of the oxide coatings may dissolve into the coolant and may be transported by the coolant throughout the systems, e.g., reactor coolant system. The accumulation of scale and deposits on the surfaces of the structures can have an adverse impact on the operational performance and integrity of the structures.

The primary side, e.g., reactor coolant system, surfaces of components in pressurized water reactors (PWRs) and the internal components in boiling water reactors (BWRs) contain radionuclides which are formed during reactor operation. The radionuclides are typically radiocobalt in a nickel ferrite lattice. A variety of systems and methods have been developed in the art to remove or reduce the presence of radionuclides on internal components of BWRs and primary side surfaces of PWR components. It is known in the art to reduce radionuclides by chemical injection. For example, a zinc compound can be injected into the coolant water of a nuclear water reactor at full power to reduce or remove radionuclides. Further, it is known to employ a high temperature process wherein a cleaning solution is prepared, heated and injected into the entire system or injected locally. Many of these known decontamination methods have proven to be cumbersome and require handling of high temperature fluid and multiple chemical steps, such as oxidation and reduction.

Thus, known radioactive decontamination typically involves elevated temperature dissolution or mechanically induced turbulence or a combination thereof depending on the intended component to be decontaminated. Further, known techniques require the flow of high temperature fluids, mechanical hand cleaning (in the case of coolant pumps) and a length of time under mechanical agitation. Furthermore, these techniques require chemistry conditions to be aggressive, e.g., switching from oxidizing to reducing conditions. Generally, known techniques employ temperature, pH and redox potential shifts for the removal or reduction of radionuclides and these techniques are rarely performed at a nuclear reactor plant due to the amount of radioactive waste generated.

It is desired in the art to develop a method for localized decontamination and deposit removal which does not require added heat, e.g., can be conducted at ambient temperature, or liquid flow.

SUMMARY OF THE INVENTION

In one aspect, the invention provides a method for at least partially disrupting or removing radioactive deposits formed on a surface of a structure in a nuclear water reactor. The method includes identifying the structure, taking the structure out of operational service, contacting the surface of the structure with an aqueous solution, and adding an effective amount of an elemental metal in solid form to the aqueous solution. The method is conducted at ambient temperature.

The radioactive deposits can include one or more materials selected from the group consisting of radionuclides, oxide scale and corrosion products.

The elemental metal can be selected from the group consisting of metals with standard electrochemical potentials anodic to low alloy steel. The electrochemical potential of the elemental metal can be more active than the potential of low alloy steel in the galvanic series of metals and alloys. The elemental metal can be selected from the group consisting of zinc, aluminum, magnesium, beryllium, lithium, iron and mixtures thereof. In certain embodiments, the elemental metal can be zinc.

The elemental metal can be in a form selected from the group consisting of slab, granular, powder, colloidal, and combinations thereof. The colloidal form can contain particles selected from the group consisting of micron-sized particles, nano-sized particles and combinations thereof.

The method can include adding to the aqueous solution one or more of a material selected from the group consisting of sequestering agent, chelating agent, dispersant, oxidizing agent, reducing agent and mixtures thereof.

The method can be performed during out of operational service conditions selected from the group consisting of shutdown and layup.

The method can further include disassociating metal ions from the radioactive deposits, precipitating the metal ions and removing the precipitate by employing a process selected from the group consisting of filtration, ion exchange and reverse osmosis.

The method can further include one of purifying the disrupted and radioactive deposits, transferring said deposits to a containment sump, adding said deposits to a radioactive waste system and transporting said deposits to a location remote from the nuclear water reactor.

In another aspect, the invention provides a composition effective to at least partially disrupt and dissolve radioactive deposits formed on a surface of a structure in a nuclear water reactor when the composition is in contact with the surface of the structure during non-operational conditions. The composition includes an aqueous component and an elemental metal component in a solid form. The composition is effective to disassociate a metal ion from an oxide lattice of the radioactive deposits.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

Figure 1:
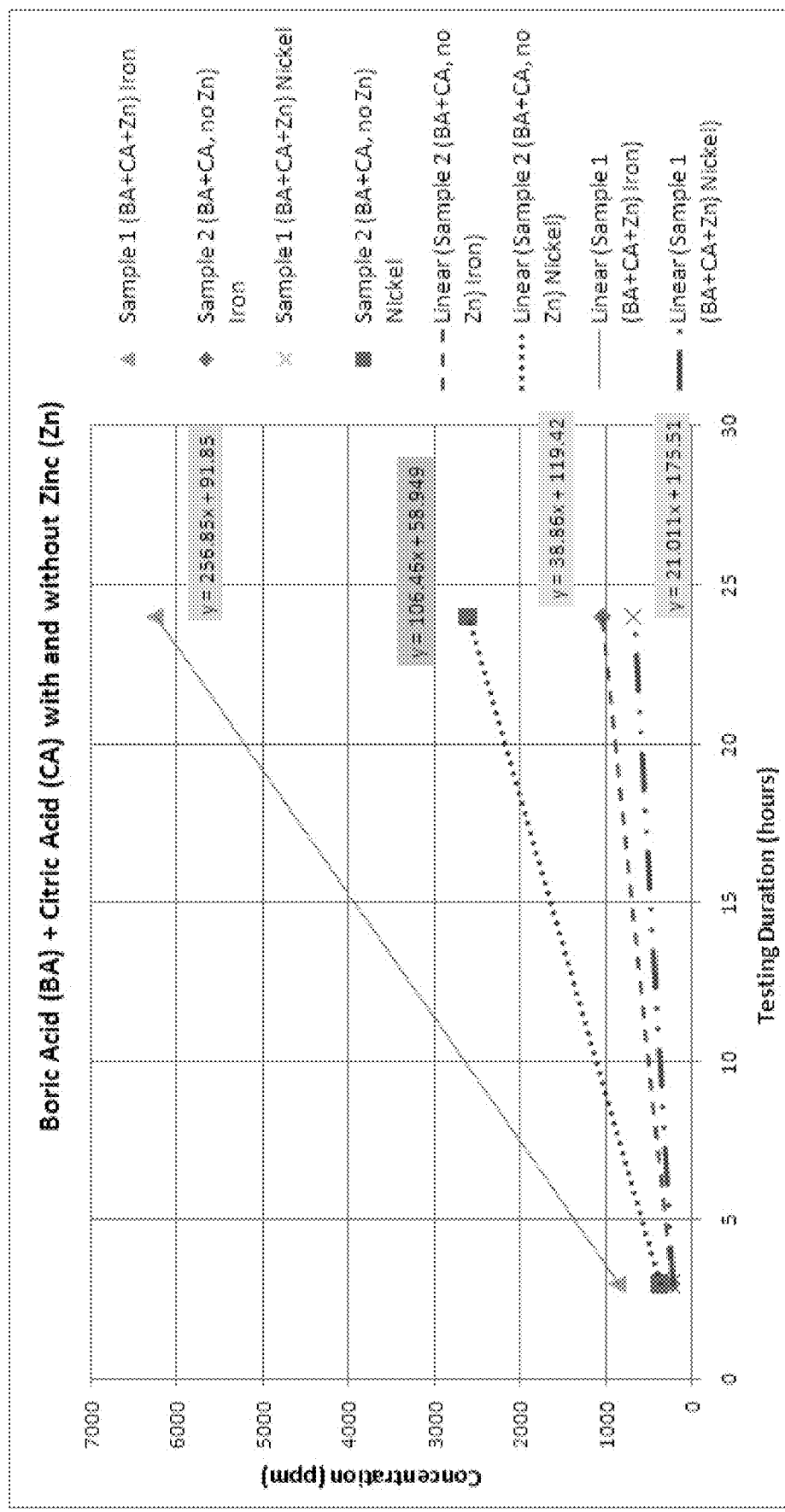
FIG. 1 is a plot showing the influence of elemental zinc on dissolution of nickel ferrite deposits under boric acid conditions.

The invention relates to systems and methods for the at least partial disruption, dissolution, removal and reduction of radioactive deposits in nuclear water reactors at ambient temperature. The radioactive deposits include radionuclides, oxide scale, and corrosion products, deposited on primary side, e.g., reactor coolant system, component surfaces and associated piping in pressurized water reactors and from internal component surfaces in boiling water reactors. Deposits containing radionuclides can form and build-up on these surfaces as a result of reactor operation. In addition, other corrosion products can also be deposited on these surfaces during reactor operation. For instance, the deposits can include contaminants such as aluminum, manganese, magnesium, calcium, nickel, and/or silicon morphologies. Removal and reduction of these products can be effective to reduce the local dose rate in the system(s) surrounding the components, to prevent or preclude flow obstructions (which occur due to corrosion product build-up), and to inhibit corrosion caused by the presence of radioactive oxide scale. The methods of the invention employ electrochemical techniques at ambient temperature to at least partially disrupt, dissolve, remove and reduce the radioactive oxide scale. The composition of the radioactive oxide scale can vary and typically can include at least one of iron, nickel, cobalt, chromium and their radioisotopes.

The invention employs an aqueous solution having an aqueous component and a solid metal component. The aqueous component includes water, e.g., reactor coolant water. The metal component includes elemental metal in solid form. The aqueous solution is effective to disassociate metal ions from an oxide lattice of radioactive deposits.

The elemental metal is selected from known metals with standard electrochemical potentials anodic to low alloy steel. In certain embodiments, the electrochemical potential of the elemental metal is more active than the potential of low alloy steel in the galvanic series of metals and alloys. Suitable examples of elemental metal for use in the invention include, but are not limited to, zinc, aluminum, magnesium, beryllium, lithium, iron or mixtures thereof. In certain embodiments, the elemental metal is zinc. The elemental metal can be in various solid or particulate forms, such as but not limited to, slab, granular, powder, colloidal, and combinations thereof. In certain embodiments, wherein the elemental metal is in colloidal fours, it can include micron-sized particles, nano-sized particles and combinations thereof. The elemental metal can be present in varying amounts, and the amount can depend on the volume of the system, component and/or associated equipment intended for decontamination. In certain embodiments, the elemental metal concentration can be from about 0.001 M to about 2 M based on volume of the aqueous solution.

The pH of the aqueous solution can vary. In certain embodiments, the pH can be adjusted within a range from about 3.0 to about 13.0. Further, the aqueous solution may be borated and contain up to 6 ppm of lithium.

The methods of the invention generally include addition of the elemental metal in solid, e.g., particulate, form to circulating coolant in an effective amount, i.e., an amount which is sufficient to at least partially disrupt, dissolve, remove or reduce the amount or level of radioactive deposits present on the surface of a structure located in the primary side of a pressurized water reactor or in a boiling water reactor. The methods of the invention can be conducted at ambient temperature and therefore, in the absence of system heat or an external heat source being applied to the structure or the system which contains the structure. Thus, the methods of the invention can be employed when the components and associated piping are taken out of operational service, e.g., during layup or shutdown conditions in a nuclear water reactor.

Further, the methods of the invention generally include identifying a component and/or associated equipment, e.g., piping, to be electrochemically decontaminated, taking the component and/or associated equipment out of operational service, isolating the component and/or associated equipment from the remainder of the primary side, e.g., reactor coolant system, employing a recirculating flow of aqueous solution in contact with the component and/or associated equipment or a static immersion of the component and/or associated equipment in aqueous solution, and adding, e.g., injecting, an effective amount of elemental metal in solid or particulate form into the aqueous solution.

Without intending to be bound by any particular theory, it is believed that the elemental metal releases one or more of its electrons which is/are accepted by the radioactive deposits, e.g., oxide scale film, present on the surface of the intended structure(s) for radioactive decontamination. A metal ion is released from the deposits and as a result, the surface charge of the deposits is modified, e.g., a charge imbalance occurs. The lattice of the radioactive deposits is destabilized and there is an increased rate of metal ion release, e.g., dissociated metal ions. In certain embodiments, elemental zinc reacts with iron oxide deposits causing the release of iron ions from the lattice.

In certain embodiments, the elemental metal can be combined with a sequestering agent, a chelating agent or a mixture or blend thereof. The sequestering and/or chelating agent can be added to the aqueous solution prior to, in conjunction with, or following the addition of the elemental metal. Suitable sequestering and chelating agents can be selected from those known in the art. Non-limiting examples of sequestering agents include acids and salts of orthophosphates, polyphosphates, 1-hydroxy ethylidene-1,1-diphosphonic acid, and mixtures thereof. Non-limiting examples of chelating agents include ligands selected from ethylenediamine tetraacetic acid (EDTA), hydroxyethyl ethylenediamine triacetic acid (HEDTA), lauryl substituted EDTA, polyaspartic acid, oxalic acid, glutamic acid, diacetic acid (GLDA), ethylenediamine-N,N'-disuccinic acid (EDDS), gluconic acid, glucoheptonic acid, N,N'-ethylenebis-[2-(o-hydroxyphenyl)]-glycine (EHPG), pyridine dicarboxylic acid (PCDA), nitrilotriacetic acid (NTA), acids and salts thereof, and mixtures thereof.

The sequestering and/or chelating agents can be utilized in varying amounts. In certain embodiments, the sequestering and/or chelating agents are present in an amount of from about 0.025 to about 5.0 weight percent based on weight of the solution composition.

The use of one or more of these agents can be effective to complex ions released from the deposits, e.g., dissociated metal ions. In certain embodiments, iron, nickel, cobalt and their corresponding isotopes can be complexed from the lattice of radioactive deposits using a sequestering agent, chelating agent or a blend thereof. The dissociated metal ions can also be complexed by allowing the dissociated metal ions to precipitate and removing the colloidal precipitate using a dispersant. Suitable dispersants can be selected from those known in the art. Non-limiting examples of dispersants include polyacrylic acid, amine neutralized polyacrylic acid, polyacrylamide, polymethacrylate, and mixtures thereof. A non-limiting example of a suitable dispersant is commercially available under the trade name OptiSperse PWR 6600 from General Electric Company. The dissociated metal ion can be precipitated from the oxide deposits and the colloidal precipitate can be removed by employing filtration, reverse osmosis, or ion exchange.

In certain embodiments, the aqueous solution may be circulated through a spectrophotometer to determine the concentration of complexed metals contained therein. Further, the expended aqueous solution may be drained through an in-line ion exchange bed, stacked filtration assembly or low micron size filter.

Without intending to be bound by any particular theory, it is believed that hydrogen gas is generated in situ during the decontamination process and facilitates mixing and mechanical agitation of the solution and particulate.

Further, the aqueous solution can be sparged with an inert gas or air for mixing, and the system which contains the intended component and/or associated equipment for decontamination can be under oxidizing or reducing conditions. For oxidizing conditions, an oxygen scavenger can be employed. Suitable oxygen scavengers can be selected from those known in the art. For reducing conditions, a reducing agent can be employed. Suitable reducing agents can be selected from those known in the art. Non-limiting examples of reducing agents include ascorbic acid, citric acid, hydrazine, carbohydrazide, catalyzed hydrazine, hydroquinone, methylethylketoxime, diethylhydroxylamine, erythorbate and mixtures thereof.

In certain embodiments, the elemental metal can be added to a local area of the nuclear reactor. Non-limiting examples include adding the elemental metal to a local area containing a jet pump orifice or a reactor coolant pump.

In certain embodiments, the deposits, e.g., radionuclides and/or radioactive oxide scale, can be conditioned with a noble metal. This conditioning step may be performed prior to adding the elemental metal to the aqueous solution.

In certain embodiments, the system is adiabatic.

The deposits, e.g., radionuclides and/or radioactive oxide scale, are at least partially disrupted and/or removed from a surface of a component and/or associated equipment, and are processed. The processing can include purifying the deposits generated by removing the particulate or transferring the deposits to a containment sump or adding the deposits to the radioactive waste system or transporting the deposits from the plant site to another location.

Without intending to be bound by any particular theory, it is believed that in accordance with the invention, solid zinc in its elemental form can react with radioactive deposits to produce a byproduct containing zinc ions. In certain embodiments, zinc ions are used during normal operation as inhibitors to stress corrosion cracking. The byproduct zinc ions prevent excessive release of zinc from primary surface oxides which have formed as a result of on-line zinc addition, by the common ion effect.

The methods of the invention do not require a rinsing step and may provide carbon molecules which may be beneficial for crud build-up on the nuclear fuel.

The methods of the invention are effective to at least partially disrupt, dissolve, remove and reduce deposits in the absence of elevated temperatures, e.g., system heat and/or an external heat source is not required. Thus, the elemental metal in a colloidal or particulate form can be applied at ambient temperature when the system is in a shutdown or layup condition.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

EXAMPLE

Nickel ferrite dissolution tests were performed in a laboratory under ambient dissolved oxygen boric acid conditions (at shutdown concentrations) and under alkaline non-borated conditions. Samples 1-4 were prepared as follows. Test volumes were 200 ml for each sample. Samples 1 and 2 included boric acid (approximately 2500 ppm boron), and Samples 3 and 4 were alkaline and did not include boric acid.

Specifically, Samples 1 and 2 included approximately 1.84 grams of citric acid and 1.29 grams of boric acid. Approximately 0.78 grams of zinc were added to Sample 1, while Sample 2 did not contain any zinc.

For Samples 3 and 4, an initial wet layup solution was prepared such that each sample contained approximately 0.009 grams of carbohydrazide and 0.2 mL of ethanolamine, and pH adjustment with added ammonium hydroxide. The final pH of the wet layup solution was approximately 10.2. Approximately 4 grams of EDTA was added to both Sample 3 and Sample 4. Subsequently, 0.8 grams of zinc was added to Sample 4, while Sample 3 did not contain any zinc.

Figure 2:
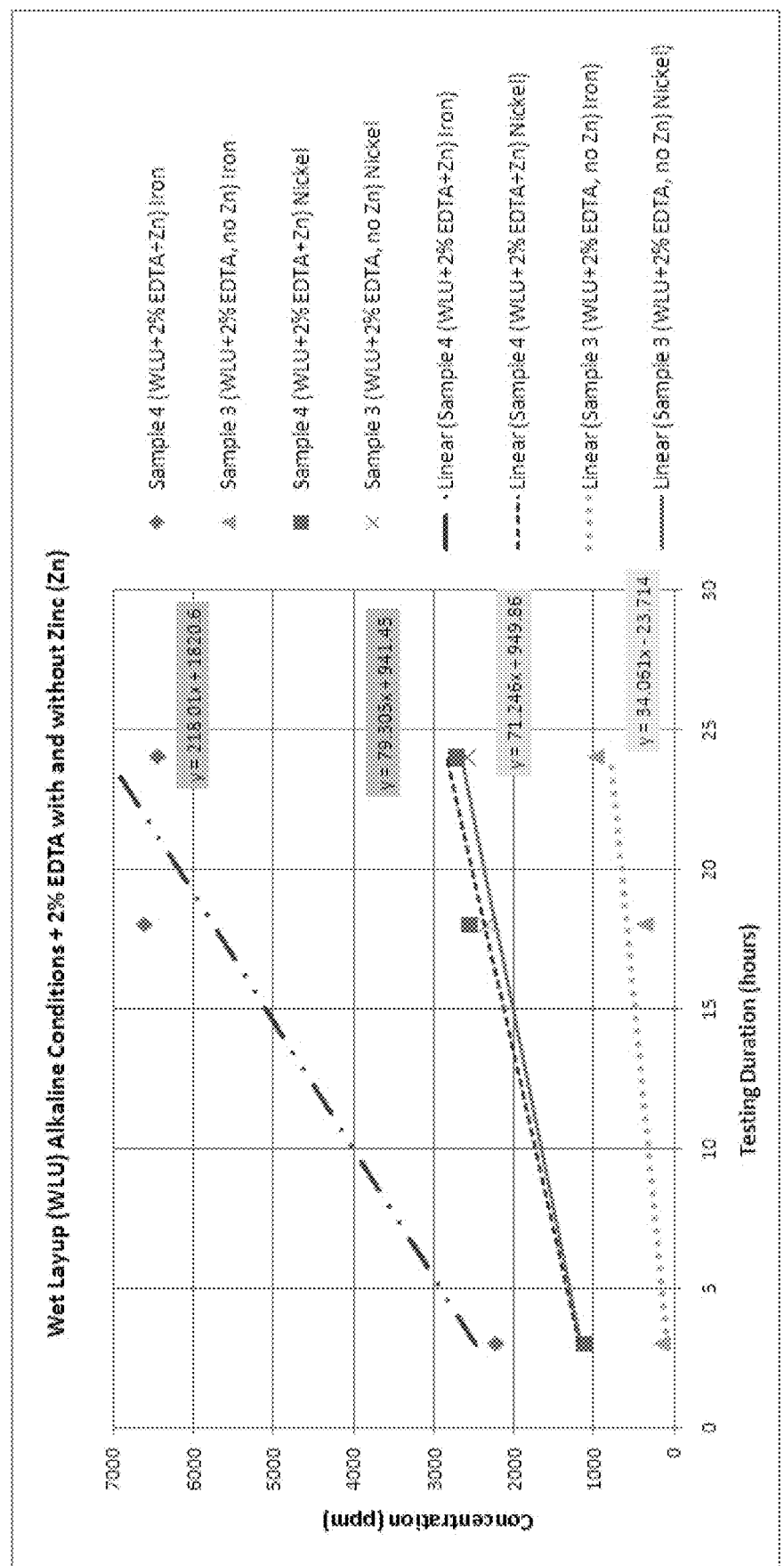
FIG. 2 is a plot showing the influence of elemental zinc on dissolution of nickel ferrite deposits under reducing conditions.

After the chemistries for each of Samples 1-4 were established, 2.5 grams of nickel ferrite was added to each and the bottles were capped. During testing, 2-3 samples were pulled from each of the Samples 1-4, and the time was recorded for each sample pull. The sample size was approximately 1 ml. The samples were filtered through a 0.45 µm-syringe filter. The tests were conducted for 23.5 hours. The pulled samples were then prepped with 100 µL of piranha bath solution containing sulfuric acid and hydrogen peroxide, diluted by a factor of 1:20, and analyzed for iron and nickel via inductively coupled plasma (ICP) spectroscopy. The results indicate a six-fold increase in the dissolution rate of corrosion products under both acidic borated conditions and alkaline non-borated conditions, as shown in FIG. 1 and FIG. 2. FIG. 1 shows the influence of elemental zinc on dissolution of nickel ferrite deposits under boric acid conditions, i.e., Samples 1 and 2. FIG. 2 shows the influence of elemental zinc on dissolution of nickel ferrite deposits under reducing conditions, i.e., Samples 3 and 4. The six-fold increase in the slope of measured iron concentration is indicative of the six-fold increase in dissolution rate under both chemistry regimes.

We claim:

1. A method for at least partially disrupting or removing radioactive deposits formed on a surface of a structure in a primary side of a nuclear water reactor, the method comprising:
   identifying the structure;
   taking the structure out of operational service;
   isolating the structure from the remainder of the primary side;
   contacting the surface of the structure with an aqueous solution while the structure is isolated from the remainder of the primary side;
   adding an amount of an elemental metal in solid form to the aqueous solution, wherein the amount is effective to at least partially disrupt or remove the radioactive deposits formed on the surface of the structure; and
   at least partially disrupting or removing the radioactive deposits formed on the surface utilizing the aqueous solution comprising the added elemental metal,
   wherein the method is conducted at ambient temperature, and
   wherein the radioactive deposits comprise oxide-containing radionuclides deposited on the surface.

2. The method of claim 1, wherein the radioactive deposits include one or more materials selected from the group consisting of oxide scale and corrosion products.

3. The method of claim 1, wherein the elemental metal is selected from the group consisting of metals with standard electrochemical potentials anodic to low alloy steel.

4. The method of claim 3, wherein the electrochemical potential of the elemental metal is more active than the potential of low alloy steel in the galvanic series of metals and alloys.

5. The method of claim 1, wherein the elemental metal is selected from the group consisting of zinc, aluminum, magnesium, beryllium, lithium, iron and mixtures thereof.

6. The method of claim 1, wherein the elemental metal is zinc.

7. The method of claim 1, wherein the elemental metal is in a form selected from the group consisting of slab, granular, powder, colloidal, and combinations thereof.

8. The method of claim 7, wherein the elemental metal is in the colloidal form.

9. The method of claim 8, wherein the colloidal form contains particles selected from the group consisting of micron-sized particles, nano-sized particles and combinations thereof.

10. The method of claim 1, further comprising adding to the aqueous solution a material selected from the group consisting of sequestering agent, chelating agent and mixtures thereof.

11. The method of claim 10, further comprising adding a dispersant to the aqueous solution.

12. The method of claim 1, further comprising adding to the aqueous solution a material selected from the group consisting of an oxidizing agent, reducing agent and mixtures thereof.

13. The method of claim 1, wherein the elemental metal is present in an amount from about 0.001 M to about 2 M based on volume of the aqueous solution.

14. The method of claim 1, wherein the aqueous solution has a pH in a range from about 3.0 to about 13.

15. The method of claim 1, wherein the nuclear water reactor is in a condition selected from the group consisting of layup and shutdown.

16. The method of claim 1, wherein contacting comprises subjecting the surface of the structure to a technique selected from the group consisting of a recirculating flow of the aqueous solution and a static immersion of the aqueous solution.

17. The method of claim 1, further comprising:
   disassociating metal ions from the radioactive deposits;
   precipitating the metal ions to form a precipitate; and
   removing the precipitate by employing a process selected from the group consisting of filtration, ion exchange and reverse osmosis.

18. The method of claim 1, further comprising at least one of purifying the disrupted and radioactive deposits, transferring said deposits to a containment sump, adding said deposits to a radioactive waste system and transporting said deposits to a location remote from the nuclear water reactor.

19. A method comprising,
   taking a structure in a nuclear water reactor out of operational service;
   contacting the surface of the structure with an aqueous solution comprising an elemental metal in an amount effective to at least partially disrupt or remove radioactive deposits formed on a surface of the structure, wherein the radioactive deposits comprise oxide-containing radionuclides deposited on the surface, wherein the elemental metal is in a form of slab, granular, powder, colloidal, or combinations thereof; and
   at least partially disrupting or removing the radioactive deposits formed on the surface utilizing the aqueous solution,
   wherein the method is conducted absent an external heat source applied to the structure.

20. A method for at least partially disrupting or removing radioactive deposits formed on a surface of a structure in a nuclear water reactor, the method comprising:
   taking the structure out of operational service;
   contacting the surface of the structure with an aqueous solution;
   adding an amount of an elemental metal in solid form to the aqueous solution, wherein the amount is effective to at least partially disrupt or remove the radioactive deposits formed on the surface of the structure;
   disassociating metal ions from the radioactive deposits;
   precipitating the metal ions to form a precipitate; and
   removing the precipitate by employing filtration, ion exchange, reverse osmosis, or a combination thereof;
   wherein the method is conducted absent an external heat source applied to the structure.

* * * * *